United States Patent
Drammeh et al.

(10) Patent No.: US 12,251,897 B2
(45) Date of Patent: Mar. 18, 2025

(54) METHOD OF PREPARING THICK LAMINATE WAFERS FOR WAFER THERMOFORMING AND INJECTION MOLDING

(71) Applicant: Essilor International, Charenton-le-pont (FR)

(72) Inventors: Ahmed Drammeh, Dallas, TX (US); Eric Begg, Dallas, TX (US); Zbigniew Tokarski, Dallas, TX (US); Peiqi Jiang, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 212 days.

(21) Appl. No.: 17/801,548

(22) PCT Filed: Feb. 25, 2021

(86) PCT No.: PCT/EP2021/054645
§ 371 (c)(1),
(2) Date: Aug. 23, 2022

(87) PCT Pub. No.: WO2021/170700
PCT Pub. Date: Sep. 2, 2021

(65) Prior Publication Data
US 2023/0140081 A1 May 4, 2023

(30) Foreign Application Priority Data
Feb. 26, 2020 (EP) .................................. 20305183

(51) Int. Cl.
B32B 25/08 (2006.01)
B29D 11/00 (2006.01)
(Continued)

(52) U.S. Cl.
CPC .... *B29D 11/00009* (2013.01); *B29D 11/0073* (2013.01); *B32B 25/08* (2013.01);
(Continued)

(58) Field of Classification Search
CPC ........ B29D 11/00009; B29D 11/00634; B29D 11/0073; B29K 2069/00; B29K 2075/00;
(Continued)

(56) References Cited

U.S. PATENT DOCUMENTS

| 7,289,257 B1 | 10/2007 | Nakagoshi |
| 2004/0125337 A1 | 7/2004 | Boulineau et al. |

(Continued)

FOREIGN PATENT DOCUMENTS

| EP | 1492658 | 1/2005 |
| JP | 2014113761 | 6/2014 |

(Continued)

OTHER PUBLICATIONS

International Search Report and Written Opinion issued in Corresponding PCT Application No. PCT/EP2021/054645, dated Aug. 19, 2021.
(Continued)

*Primary Examiner* — Lawrence D Ferguson
(74) *Attorney, Agent, or Firm* — Norton Rose Fulbright US LLP (57) ABSTRACT

A method of forming an ophthalmic laminate lens, includes: forming a planar laminate by adhering a first polycarbonate layer to a first side of a thermoplastic elastomer layer, and adhering a second polycarbonate layer to a second side of the thermoplastic elastomer layer, the first polycarbonate layer having a thickness greater than 250 μm, the second polycarbonate layer having a thickness greater than 250 μm, and the thermoplastic elastomer layer having a thickness in a range of 15 μm to 150 μm; thermoforming the planar
(Continued)

laminate into a curved laminate, the curve laminate having a pre-molding curvature; arranging the curved laminate in a mold; and molding, via the mold set at a predetermined temperature and a predetermined pressure, the curved laminate with a polymer melt into a curved lens.

13 Claims, 6 Drawing Sheets

(51) Int. Cl.
*G02B 1/04* (2006.01)
*B29K 69/00* (2006.01)
*B29K 75/00* (2006.01)

(52) U.S. Cl.
CPC .......... *G02B 1/041* (2013.01); *B29K 2069/00* (2013.01); *B29K 2075/00* (2013.01); *B32B 2307/732* (2013.01); *B32B 2551/00* (2013.01)

(58) Field of Classification Search
CPC .............. B32B 2307/732; B32B 25/08; B32B 2551/00; G02B 1/041
See application file for complete search history.

(56) References Cited

U.S. PATENT DOCUMENTS

| | | |
|---|---|---|
| 2012/0249949 A1 | 10/2012 | Miyoshi |
| 2014/0265010 A1 | 9/2014 | Park et al. |
| 2017/0075143 A1 | 3/2017 | Saylor et al. |
| 2017/0205639 A1 | 7/2017 | McCabe et al. |
| 2017/0329051 A1 | 11/2017 | Vu et al. |
| 2020/0050019 A1 | 2/2020 | Jiang et al. |

FOREIGN PATENT DOCUMENTS

| | | |
|---|---|---|
| JP | 2019003104 | 1/2019 |
| WO | WO 2001049478 | 7/2001 |

OTHER PUBLICATIONS

International Search Report and Written Opinion issued in Corresponding PCT Application No. PCT/EP2021/054642, dated May 12, 2021.

FIG. 1A

Arc length = $d_{fw}$

METHOD OF PREPARING THICK LAMINATE WAFERS FOR WAFER THERMOFORMING AND INJECTION MOLDING

CROSS-REFERENCE TO RELATED APPLICATIONS

This application is a national phase application under 35 U.S.C. § 371 of International Application No. PCT/EP2021/054645 filed 25 Feb. 2021, which claims priority to European Patent Application No. 20305183.4 filed 26 Feb. 2020. The entire contents of each of the above-referenced disclosures is specifically incorporated by reference herein without disclaimer.

FIELD OF THE INVENTION

The present disclosure relates to thermoplastic elastomeric-based optically functional film laminates, film constructions that allow thermoforming wafers to high base curves, and suppression of haze and cold flow lines during injection molding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Functional optical films and/or laminates can be shaped (formed) and over-molded into lenses for photochromic, polarizer, or other functional applications. This includes methods to fabricate laminate constructions, shape the laminate into a curved wafer, and injection molding to form lenses for health or light management applications.

Injection molding of polymers, for example polycarbonate or polyamide, can be used to manufacture prescription or non-corrective eyeglass lenses. This method of polymer injection molding can be extended to over-molding of a thin, multi-layer laminate construction with a center functional film of a predetermined material that will change the overall functionality of the resulting lens. For example, a method to make corrective or non-corrective polarized sunglass lenses can utilize a multi-layer laminate that includes a layer impregnated with photochromic and/or polarizing dye as the center functional film.

The physical properties of the center functional film may range from elastic to viscoelastic and be crystalline to amorphous (and any portions in between) depending on the material type and its physicomechanical properties. However, for a center functional film with a low glass transition temperature, defects in the resulting lens can be introduced as operating temperatures during fabrication approach the center film's glass transition temperature. Thus, a method for preparing thick laminate wafers via thermoforming and fabricating lenses via injection molding with fewer defects is desired.

SUMMARY

The present disclosure relates to a method of fabricating an ophthalmic laminate lens, the method including: forming a planar laminate by adhering a first polycarbonate layer to a first side of a thermoplastic elastomer layer, and adhering a second polycarbonate layer to a second side of the thermoplastic elastomer layer, the first polycarbonate layer having a thickness greater than 250 µm, the second polycarbonate layer having a thickness greater than 250 µm, and the thermoplastic elastomer layer having a thickness in a range of 15 µm to 150 µm; thermoforming the planar laminate into a curved laminate, the curve laminate having a pre-molding curvature; arranging the curved laminate in a mold; and molding, via the mold set at a predetermined temperature and a predetermined pressure, the curved laminate with a polymer melt into a curved lens.

The disclosure additionally relates to an ophthalmic lens laminate, including: a first polycarbonate layer having a thickness greater than 250 µm; a second polycarbonate layer having a thickness greater than 250 µm; and a thermoplastic elastomer layer having a thickness in a range of 15 µm to 150 µm, the thermoplastic elastomer layer being disposed between the first and second polycarbonate layers, the thermoplastic elastomer layer being bonded to the first polycarbonate layer on a first side of the thermoplastic elastomer and bonded to the second polycarbonate layer on a second side of the thermoplastic elastomer.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Die cutting tools can be used to cut wafers from flat laminate sheets into circular or oval disks. These flat laminate wafers are then thermoformed into a spherical dome shape. The diameter of the flat laminate wafers is determined by considering: the desired lens diameter (e.g., 70 mm, 76 mm, 80 mm, etc.), the base curve of the thermoformed wafer (e.g., 0.25, 1.75, 3.00, 4.00, 4.50, 5.50, 6.00, 6.50, 7.25, 8.00 D, etc.), and the base curve of the mold insert (e.g., 1.75, 2.25, 3.25, 4.25, 5.50, 6.50, 7.50, 8.50 D, etc.). The base curve of the mold insert can be the same base curve as the convex power surface of the lens. A flat, non-circular or oval wafer pattern may be used if the wafer shrinks unevenly in any one dimension more than in another dimension so that a substantially circular wafer is obtained after thermoforming This forming process is commonly done by a vacuum assisted forming process where the difficulties of converting the flat wafers into quality thermoformed wafers is heightened at high bases (>4.00 D, radius of curvature measured in diopters).

Thermoplastic elastomers offer many beneficial properties when used as the main matrix for the functional center layer. The soft polymer segments offer flexibility and additive compatibility while the harder segments offer rigidity and stiffness. However, thermoplastic elastomers (e.g., aliphatic thermoplastic polyurethanes, polyether-block-amide polyurethanes, etc.) are a class of polymers that can deform and flow under typical thermoforming and molding operations, leading to edge bleed and ooze. Thermoplastic polyurethanes with a poly-ether block poly-amide segments are semi-crystalline polymers that can develop a hazy appearance (due to large spherulite growth) if cooled slowly from a viscous phase. Unlike rigid polyvinyl alcohol (PVA) polar based functional films, laminates made with thermoplastic elastomers can take on an embossed or imprinted defect from contact with a hot defective surface (e.g. on thermoformer insert or the concave or convex mold inserts).

Furthermore, many functional films or laminates have thicknesses between the 200-300 micrometer range, which presents issues during thermoforming because that thickness range is not sufficient to overcome all issues presented by the physiomechanical nature of the functional film. Therefore, an improved laminate structure is desired that addresses the aforementioned issues.

Techniques herein provide methods and devices for fabricating ophthalmic laminate lenses. The described embodiments can utilize a multilayer stack, for example a 3-ply laminate, made with outer polymer layers on either side of a center functional layer as a portion of the lens. As previously described, the center functional layer can be affected by fabrication conditions due to the temperature sensitivity of some materials utilized for the center functional film. For instance, physical properties of the center functional film can range from elastic to viscoelastic and be crystalline to amorphous (and any portions in between), which are affected by the operating temperature. The outer polymer films can be fabricated to provide improved thermal insulation for the center functional film. For example, a change in a thickness of one or both outer polymer films can accommodate this range of center functional film properties experienced during shaping (thermoforming, hydroforming, etc.) of the laminate from a flat wafer into a curved wafer, during injection molding, or both.

Figure 1A:
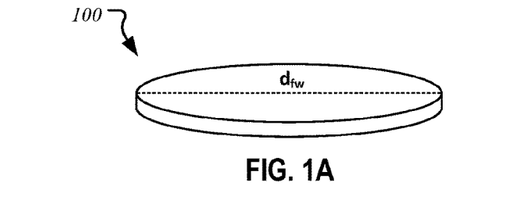
FIG. 1A is a schematic of a flat laminate wafer, according to an embodiment of the present disclosure.

FIG. 1A is a schematic of a flat laminate wafer 100, according to an embodiment of the present disclosure. FIG. 1A shows diameters and base curves of various components involved in cutting, thermoforming, and molding. In an embodiment, a diameter, $d_{fw}$, of a circular flat wafer is the same length as an arc length of the flat laminate wafer 100 after thermoforming.

Figure 1B:
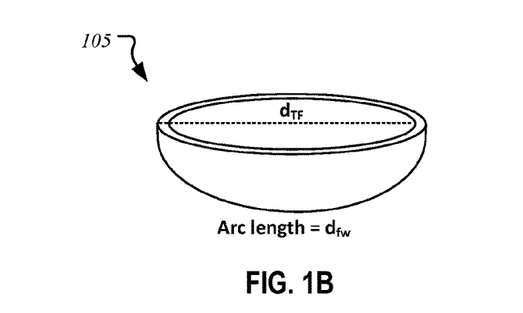
FIG. 1B is a schematic of a thermoformed laminate wafer, according to an embodiment of the present disclosure.

FIG. 1B is a schematic of a thermoformed laminate wafer 105, according to an embodiment of the present disclosure. In an embodiment, a cord length, $d_{TF}$, of the thermoformed laminate wafer 105 can be approximately the same diameter as a diameter of the lens.

Figure 1C:
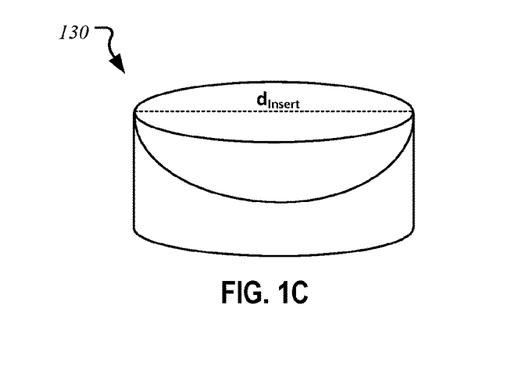
FIG. 1C is a schematic of a concave mold insert, according to an embodiment of the present disclosure.

FIG. 1C is a schematic of a concave mold insert 130, according to an embodiment of the present disclosure. In an embodiment, the diameter of the lens can be determined by, for example, a diameter, $d_{Insert}$, of the concave mold insert 130. Thus, both the chord length ($d_{TF}$) and the concave mold insert 130 diameter ($d_{Insert}$) can be smaller in diameter than the diameter ($d_{fw}$) of the flat laminate wafer 100. The arc length of the concave mold insert 130 is equal to or greater than the arc length of the thermoformed laminate wafer 105 due to the differences in the base curves of the flat laminate wafer 100 and the concave mold insert 130.

Figure 1D:
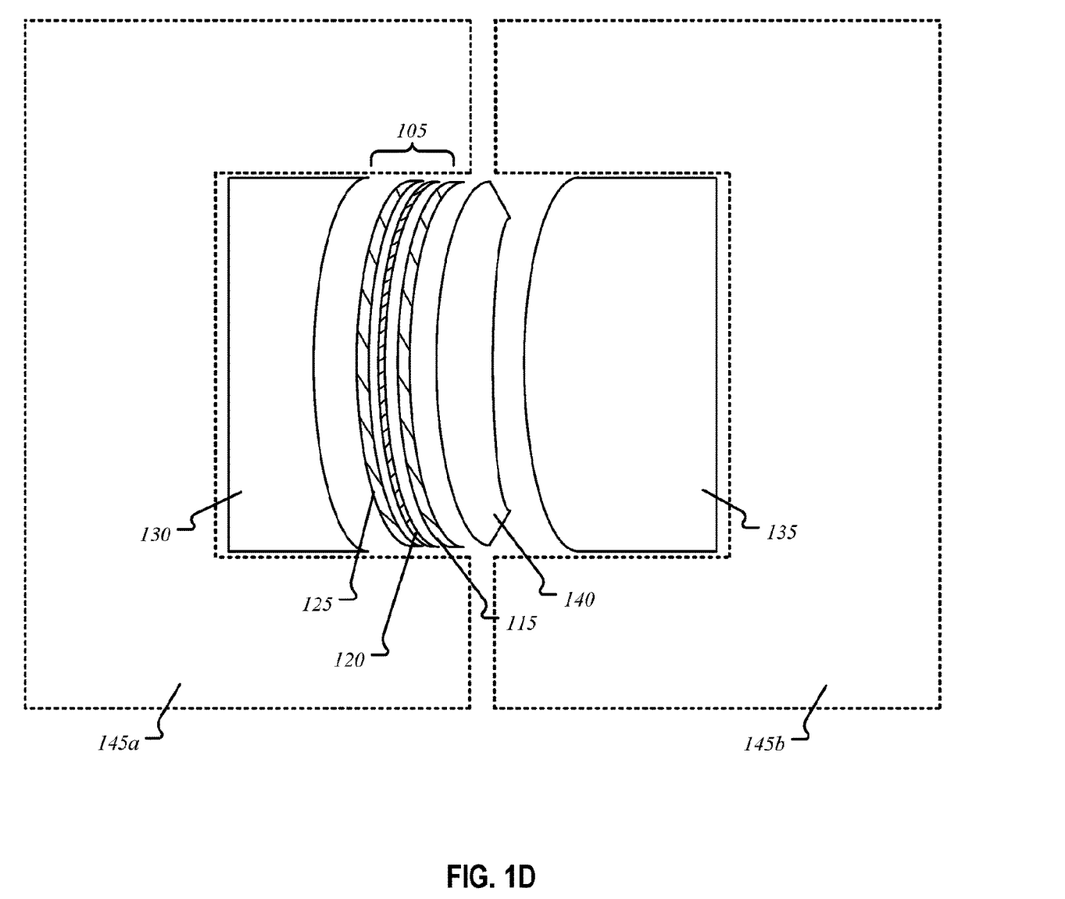
FIG. 1D is a schematic of a molding device, according to an embodiment of the present disclosure.

FIG. 1D is a schematic of a molding device, according to an embodiment of the present disclosure. In an embodiment, the molding device can include a first mold side 145a, a second mold side 145b, the concave mold insert 130, and a convex mold insert 135. The first mold side 145a and the second mold side 145b can each include a hollow portion, wherein the concave mold insert 130 and the convex mold insert 135 can be removably disposed therein. As shown in FIG. 1D, the first mold side 145a including the concave mold insert 130 can be configured to couple with the second mold side 145b including the convex mold insert 135. Upon coupling, the concave mold insert 130 and the convex mold insert 135 can form a cavity connected to a hollow line formed by the coupling of the first and second mold sides 145a, 145b. The line can be configured to receive a polymer, for example, via a screw feeder or similar device. The cavity can be configured to receive the thermoformed laminate wafer 105. A curvature of the concave mold insert 130 and a curvature of the convex mold insert 135 can determine a lens power of the resulting lens. For a semi-finished lens, a curvature along a convex side of the lens is fixed and the concave side of the lens can be modified after molding, for example via grinding and polishing. Note that multiple lines for receiving the polymer can be connected, such that an injection of the polymer from a source can fill multiple mold devices with a single injection and allow for parallel fabrication of multiple lenses.

Prior to placement in the molding device, the flat laminate wafer 100 can be thermoformed into the spherical dome shape of the thermoformed laminate wafer 105, for example via a thermoforming machine. During thermoforming, the flat laminate wafer 100 can be placed onto a heated thermoforming insert, and a vacuum assisted force can be applied to secure the flat laminate wafer 100 to the thermoforming insert. By adjusting a temperature of the applied heat and a force of the applied vacuum, the flat laminate wafer 100 can be formed to the curved shape of the thermoforming insert to produce the thermoformed laminate wafer 105.

In an embodiment, the flat laminate wafer 100 can include a first layer 115, a center layer 120, and a second layer 125. As shown in FIG. 1D, thermoforming the flat laminate wafer 100 can produce a curved structure with the first layer 115 being a concave side and the second layer 125 being a convex side.

In an embodiment, the thermoformed laminate wafer 105 can be arranged in the molding device adjacent to the concave mold insert 130, wherein the convex side of the thermoformed laminate wafer 105 (i.e. the second layer 125) is adjacent to the concave mold insert 130. The thermoformed laminate wafer 105 rests against the concave mold insert 130 and an edge of the thermoformed laminate wafer 105 extends out to an edge of the concave mold insert 130 ($d_{TF}=d_{Insert}$) to secure the thermoformed laminate wafer 105 in the mold cavity. Smaller diameter flat laminate wafers 100 can be used when the thermoformed laminate wafer 105 base curve is smaller than the base curve of the concave mold insert 130 to maintain a constant cord length (or lens diameter), i.e., the cord length for all thermoformed laminate wafer 105 base curves preferably equals the concave mold insert 130 diameter to prevent the thermoformed laminate wafer 105 from falling out of the cavity during loading operations. This is particularly relevant when vacuum is used and a seal is needed between the thermoformed laminate wafer 105 and the concave mold insert 130.

Also note that the circumference of the flat laminate wafers 100 can be larger than that of the thermoformed laminate wafer 105 by the ratio of $d_{fw}/d_{TF}$. Above a predetermined ratio, edge deformation occurs and the extra length at the edge of the flat laminate wafer 100 can be accommodated by compression, out-of-plane deformation, buckling, or crease formation at the edge of the thermoformed laminate wafer 105.

The flat laminate wafer 100 can be thermoformed to mid (4.00 D) to high (8.50 D) base curves where the diameter of the flat laminate wafer 100, $d_{fw}$, is much greater than the diameter of the thermoformed laminate wafer 105, $d_{TF}$. The ability to successfully subject a laminate structure (e.g., the flat laminate wafer 100) under forces of tension and compression without failure is substantially based on mechanical properties of the composition of the laminate. Mechanical properties such as rigidity, ductility and elasticity play a major role in the thermoforming of the flat laminate wafer 100. The use of thick (>50 microns), softer, and more ductile materials for the center layer 120 compounds the likelihood of defects. Commonly observed wafer defects include buckling and crease formation at any alignment or centering tab. Increasing rigidity of the flat laminate wafer 100 via adjust thicknesses of the layers is described herein. It may be appreciated that known devices and methods can be used to thermoform the flat laminate wafer 100, for example a LEMA of Italy machine that incrementally increases the curvature of the flat laminate wafer 100 under applied heat.

Figure 2A:
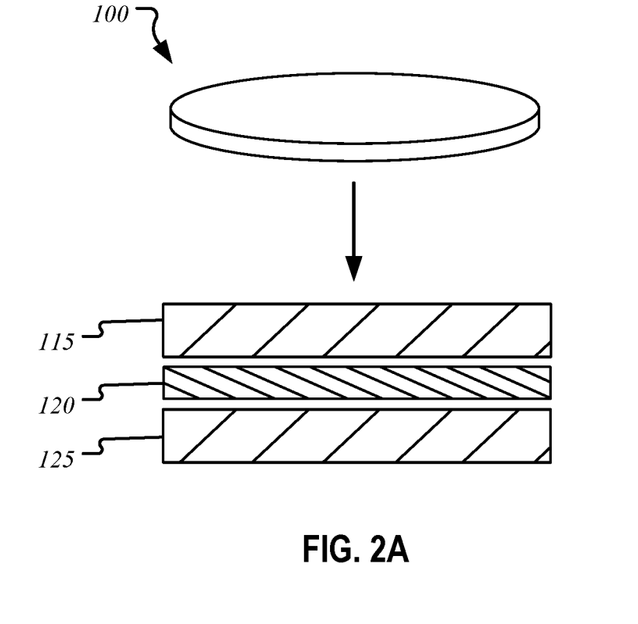
FIG. 2A is a schematic of layers in a flat laminate wafer, according to an embodiment of the present disclosure.

FIG. 2A is a schematic of the layers in the flat laminate wafer 100, according to an embodiment of the present disclosure. It may be appreciated that techniques known by those in the art can be used to fabricate the flat laminate wafer 100. In an example, adhesive lamination can be utilized, wherein the first layer 115 and the second layer 125 are bonded to the center layer 120 using an adhesive and brought into close proximity by a pair of nipped rollers. The nipped rollers can be configured to facilitate the spreading of the adhesive, controlling the thickness of the flat laminate wafer 100, and for squeezing the layers together. In another example, extrusion lamination can be utilized, wherein a hot molten center layer 120 is sandwiched between the first layer 115 and the second layer 125. The thickness in this example can be adjusted via the nipped roller gap setting. In another example, adhesive coating lamination can be utilized, wherein the center layer 120 can be solvent cast on a carrier film and dried. In this state, the center layer 120 is more adhesive and tacky, allowing it to be transferred from the carrier film to the first layer 115 and the second layer 125 using a pair of nipped rollers that are configured to pressure seal the layers together. Thus, as described above, an optional adhesive can be disposed between the center layer 120 and the outer first and second layers 115, 125 in some examples. In other examples, the layers can be bonded directly.

The center layer 120 can be an optically functional thermoplastic elastomeric resin. In an example, the center layer 120 can be thermoplastic polyurethane (TPU). In another example, the center layer 120 can be semi-crystalline polyether-block-polyamides (PEBA). Notably, optical additives (e.g., photochromic dye, tint dye, dye absorbers of selective wavelengths, electrochromic dyes, and the like) can be blended with the center layer 120 to produce an optically functional film. The first layer 115 and the second layer 125 can be, for example, polycarbonate, cellulose esters (e.g., cellulose triacetate), acrylics, cyclic olefin copolymers, and the like, and optically transparent with little to no haze.

Figure 2B:
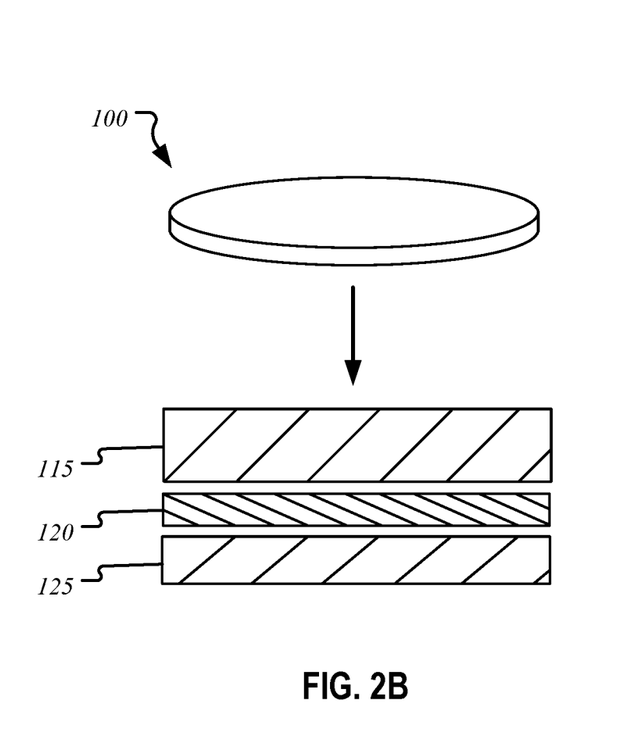
FIG. 2B is a schematic of layers in the flat laminate wafer with asymmetrical thicknesses, according to an embodiment of the present disclosure.

FIG. 2B is a schematic of the layers in the flat laminate wafer 100 with asymmetrical thicknesses, according to an embodiment of the present disclosure. In an embodiment, the flat laminate wafer 100 can include the first layer 115, the center layer 120, and the second layer 125, wherein the first layer 115 is configured to thermally insulate the center layer 120 and provide additional structural rigidity during thermoforming, and the first layer 115 and the second layer 125 have different thicknesses. For example, the thickness of the second layer 125 can be approximately 250 micrometers (μm). To thermally insulate the center layer 120 and provide additional structural rigidity during thermoforming, the thickness of the first layer 115 can be greater than 250 μm. For example, the thickness of the first layer 115 can be in the range of 350 to 800 μm. The thickness of the center layer 120 can be in the range of, for example, 15 to 150 μm. This structure can be used in FIG. 3A. The thicker first layer 115 can also reduce defects in the form of buckling, deformation, or creasing when thermoforming to a high base curve, for example a base curve of 4.00 D or higher. Notably, the thermoformed laminate wafer 105 having the thick first layer 115 can be molded directly to the high base curve (e.g. 8.00 D) in a single pass without intermediate steps. That is, directly from the flat laminate wafer 100 to the 8.00 D base curve without any forming to intermediate base curves.

In an alternative embodiment, the second layer 125 is thicker than the first layer 115. For example, the thickness of the first layer 115 can be approximately 250 μm and the thickness of the second layer 125 can be greater than 250 μm. Thus, when arranged in the mold device, the thicker layer (the second layer 125) is adjacent to the concave mold insert 130.

Figure 2C:
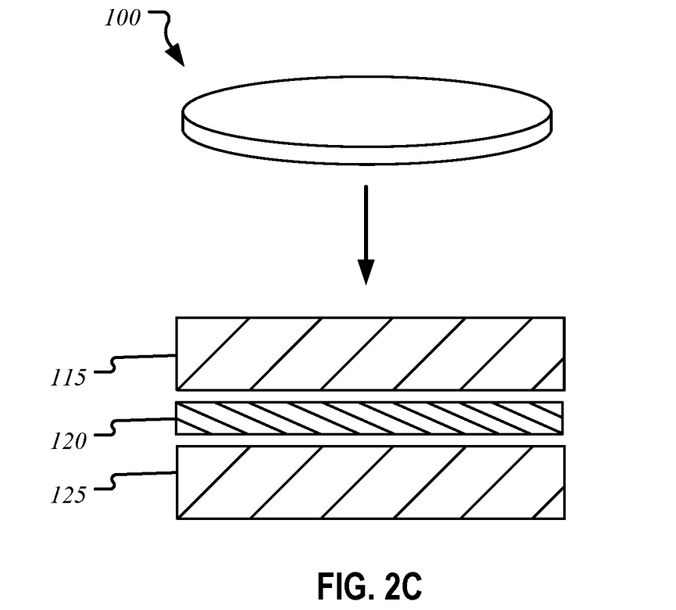
FIG. 2C is a schematic of layers in a flat laminate wafer with symmetrical thicknesses, according to an embodiment of the present disclosure.

FIG. 2C is a schematic of the layers in the flat laminate wafer 100 with symmetrical thicknesses, according to an embodiment of the present disclosure. In an embodiment, the flat laminate wafer 100 can include the first layer 115, the center layer 120, and the second layer 125, wherein the first layer 115 is configured to thermally insulate the center layer 120 and provide additional structural rigidity during thermoforming, and the first layer 115 and the second layer 125 have the same thicknesses. To thermally insulate the center layer 120 and provide additional structural rigidity during thermoforming, the thickness of the first layer 115 can be greater than 250 μm. For example, the thickness of the first layer 115 can be in the range of 350 to 800 μm. The thickness of the second layer 125 can be the same as the first layer 115. The thickness of the center layer 120 can be in the range of, for example, 15 to 150 μm.

Figure 2D:
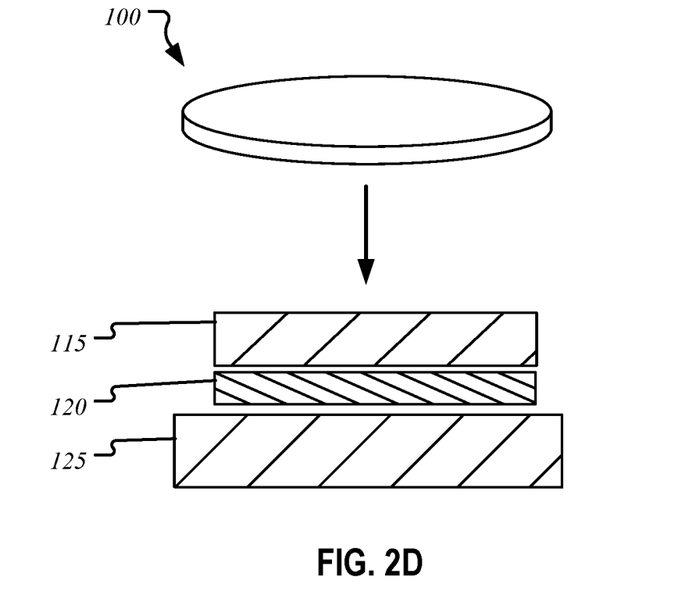
FIG. 2D is a schematic of layers in a flat laminate wafer with asymmetrical thicknesses and varying diameters, according to an embodiment of the present disclosure.

FIG. 2D is a schematic of the layers in the flat laminate wafer 100 with asymmetrical thicknesses and varying diameters, according to an embodiment of the present disclosure. In an embodiment, the flat laminate wafer 100 can include the first layer 115, the center layer 120, and the second layer 125, wherein the first layer 115 and the center layer 120 have the same diameter that is smaller than the diameter of the second layer 125, and the second layer 125 is thicker than the first layer 115. The thickness of the second layer 125 can be greater than 250 μm to provide additional structural rigidity during thermoforming. For example, the thickness of the second layer 125 can be in the range of 350 to 800 μm. The thickness of the first layer 115 can be approximately 250 micrometers (μm). The thickness of the center layer 120 can be in the range of, for example, 15 to 150 μm. This structure can be used in FIG. 3B. Notably, one advantage of using the asymmetrical thickness design is to reduce the total laminate thickness so that the flat laminate wafer 100 will not be too thick to form. Also, because the first layer 115 and the center layer 120 having a smaller diameter than the second layer 125, the flat laminate wafer 100 can be thermoformed with less defects along the edge of the wafer, delamination, and buckling on the concave side. Furthermore, the asymmetrical thickness design does not increase the total thickness substantially and is compatible with injection molding.

In an alternative embodiment, the first layer 115 is the same thickness as the second layer 125. For example, the thickness of the first layer 115 can be in the range of 350 to 800 μm. In this embodiment, the advantage of additional structural rigidity is still achieved via one of the first layer 115 or the second layer 125 being thick.

Figure 3A:
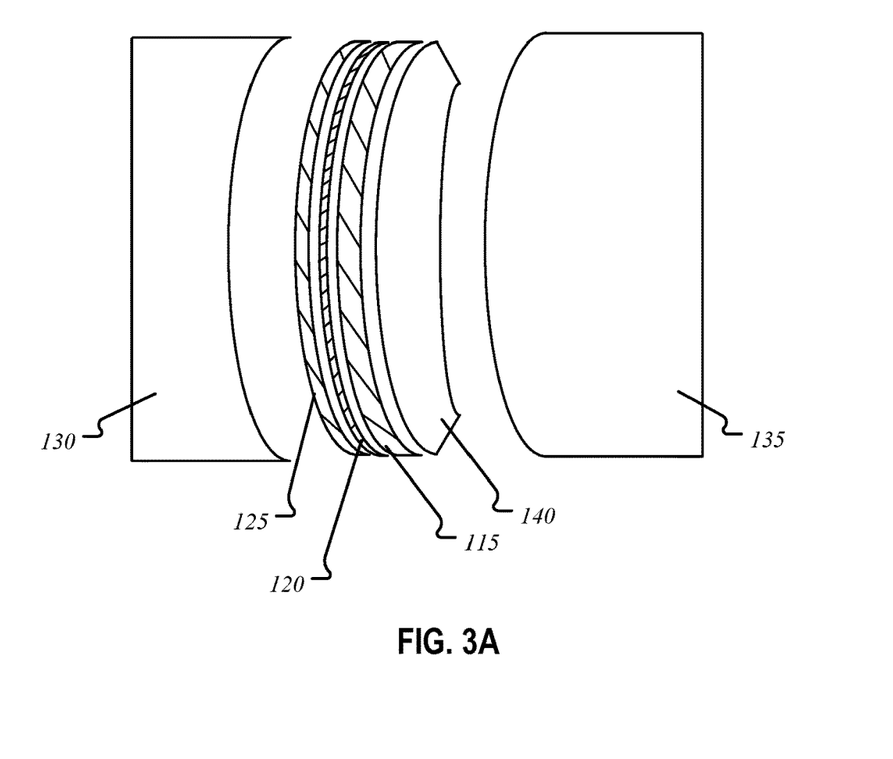
FIG. 3A is a schematic of a thermoformed laminate wafer with asymmetrical layer thicknesses in a molding device, according to an embodiment of the present disclosure.

FIG. 3A is a schematic of the thermoformed laminate wafer 105 with asymmetrical layer thicknesses in the molding device, according to an embodiment of the present disclosure. In an embodiment, the thermoformed laminate wafer 105 is arranged in the cavity such that the thicker first layer 115 is adjacent to where the polymer melt 140 will be injected into the cavity. Starting with an open mold device, the thermoformed laminate wafer 105 is arranged adjacent to the concave mold insert 130. The first mold side 145a with the concave mold insert 130 housed therein is brought together to couple with the second mold side 145b with the convex mold insert 135 housed therein. This may be performed by, for example, a hydraulic or electrical press pushing one of the mold sides 145a, 145b to close against the other. After coupling the mold sides 145a, 145b, the polymer melt 140 (e.g., molten polycarbonate) is injected into the cavity of the mold device between the thermoformed laminate wafer 105 and the convex mold insert 135. In some implementations, the polymer melt 140 includes a transparent or semi-transparent thermoplastic material, such as polycarbonate, thermoplastic urethane, polyacrylate, polyester, copolyester, polymethacrylate, poly(methyl methacrylate), polystyrene, polyamide, polysulfone, polyphenylsulfone, polyetherimide, polypentene, polyolefin, ionomer, ethylene methacrylic acid, cyclic olefin copolymer, acrylonitrile, styrene maleic anhydride, a copolymer thereof, or a derivative or mixture thereof.

The polymer melt 140 slowly cools inside the mold over time, bonds with the thermoformed laminate wafer 105, and can be ejected from the mold device when the mold sides 145a, 145b are decoupled. The mold sides 145a, 145b can be independently thermally controlled. The concave and convex mold inserts 130, 135 can also be independently thermally controlled or rely on the mold sides 145a, 145b for heat dissipation. That is, the concave and convex mold inserts 130, 135 can be thermally coupled to the mold sides 145a, 145b, and the mold sides 145a, 145b can be large enough of a heat sink to absorb heat transferred from the polymer melt 140 to the concave and convex mold inserts 130, 135 during cooling. Notably, the increased thickness for the first layer 115 or the second layer 125 provides sufficient structural integrity to prevent the outer edge of the thermoformed laminate wafer 105 from buckling during thermoforming, thus leading to fewer defects in lenses after injection molding.

In an embodiment, the center layer 120 is polyetherblock-amide (PEBA). Injection molding of PEBA introduces a fabrication challenge due to the morphological properties of the PEBA polymer, which is mainly based on intermolecular order and crystallinity, both of which are affected by elevated temperatures during fabrication. When the thermoformed laminate wafer 105 with the PEBA center layer 120 is injection molded with the polymer melt 140, the resulting semi-finished lens can include a distinct and repeatable defect in the center or throughout the lens known as "haze". This haze can be a product of heating and subsequent slow cooling of the PEBA center layer 120 due to heat transfer from the polymer melt 140 through the first layer 115 to the center layer 120 Importantly, if the first and second layers 115, 125 are thin, then the increased amount of heat transferred to the PEBA center layer 120 causes crystalline regions in the center layer 120 to melt. Furthermore, because the first and second layers 115, 125 are both thin, the cooling of the PEBA center layer 120 follows the slower cooling rate of the polymer melt 140. This slow cooling rate allows the crystalline regions of the PEBA center layer 120 to grow large, which results in scattered light and haze in the final lens. Therefore, with the asymmetric thickness design of the thermoformed laminate wafer 105 having a thicker first layer 115 adjacent to the polymer melt 140, the temperature of the PEBA center layer 120 is more similar to the temperature of the concave mold insert 130. This means the PEBA center layer 120 is thermally insulated from the heat of the polymer melt 140 due to the thick first layer 115, leading to a faster cooling rate. The faster cooling rate hinders the growth of large crystalline regions in the PEBA center layer 120 and thus the final lens scatters less light. Thus, thickness of the first layer 115 can be determined based on a temperature of the injected polymer melt 140 such that the thickness of the first layer 115 prevents heat transfer from the polymer melt 140 to the center layer 120 above a predetermined threshold, wherein the predetermined threshold is determined by a cooling rate of the center layer 120 such that growth of crystalline regions in the center layer 120 is hindered or prevented entirely.

Figure 3B:
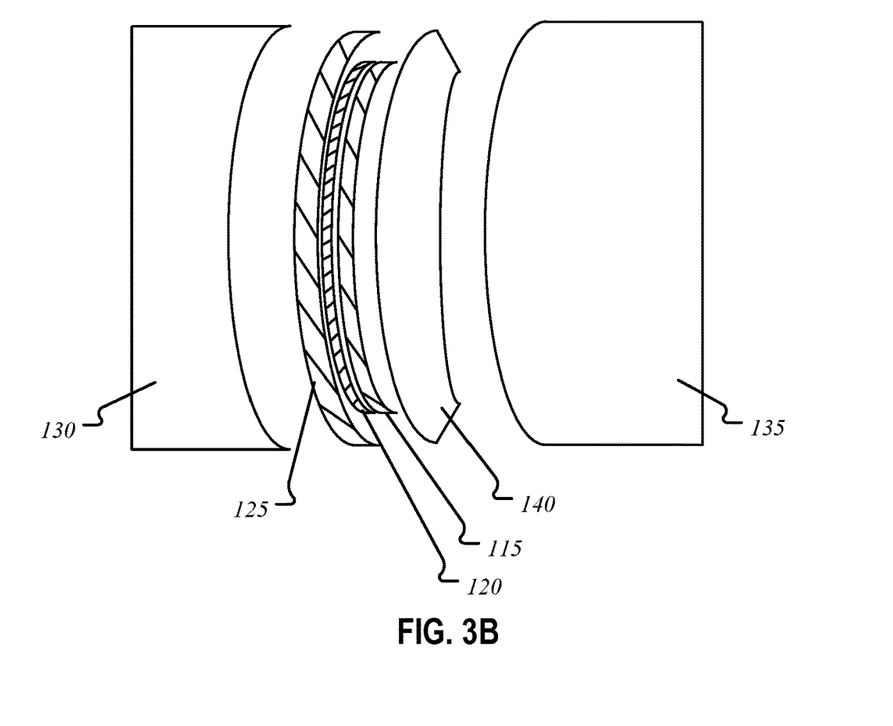
FIG. 3B is a schematic of the thermoformed laminate wafer with different layer diameters in a molding device, according to an embodiment of the present disclosure

FIG. 3B is a schematic of the thermoformed laminate wafer 105 with different layer diameters in a molding device, according to an embodiment of the present disclosure. In an embodiment, the diameter of the first layer 115 and the center layer 120 can be smaller than the second layer 125 so that the thermoformed laminate wafer 105 can be thermoformed very well to high base curve (>4.0 D base) without edge wrinkle. Another advantage of using the asymmetrical thickness and diameter design is for better injection molding processing to avoid any contamination of the concave and convex mold inserts 130, 135. Similarly, the thermoformed laminate wafer 105 is arranged in the cavity such that the first layer 115 is adjacent to where the polymer melt 140 will be injected into the cavity. The injection molding process as described for FIG. 3A can then be performed.

Figure 4:
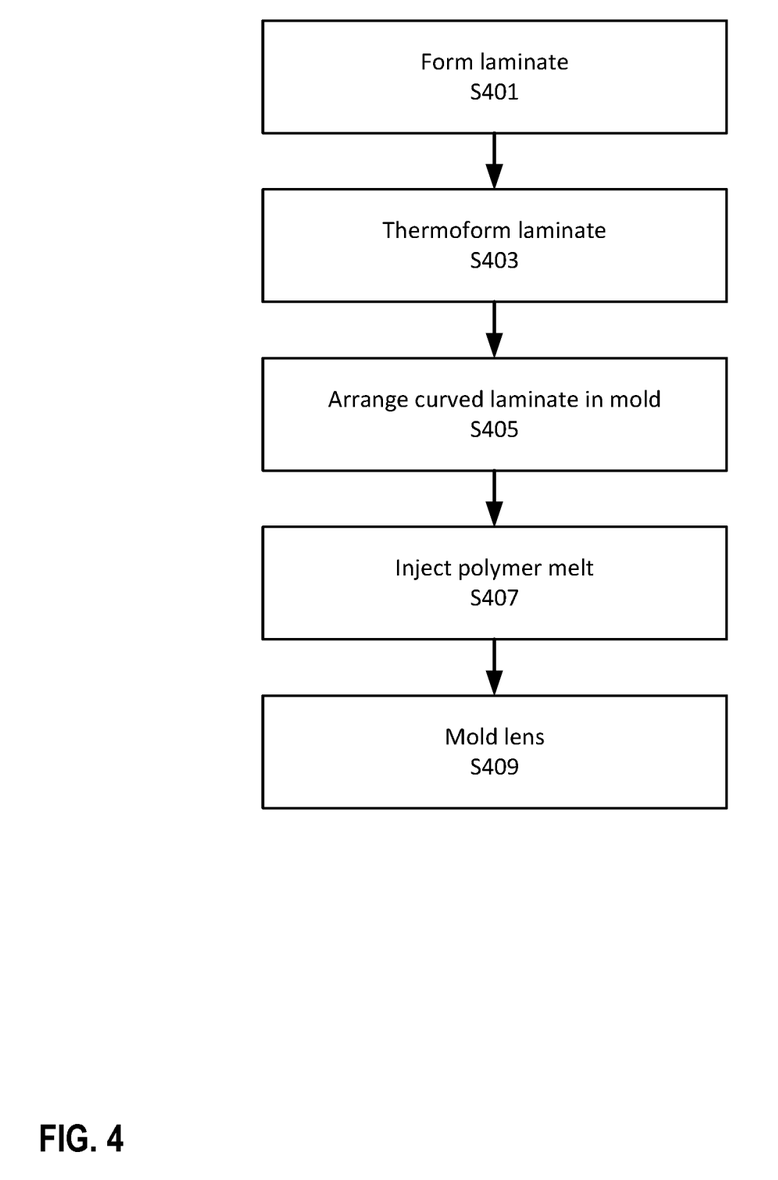
FIG. 4 is a flow chart for a method of fabricating an ophthalmic lens, according to an embodiment of the present disclosure.

FIG. 4 is a flow chart for a method of fabricating an ophthalmic lens, according to an embodiment of the present disclosure. In step S401, the flat laminate wafer 100 is formed. For example, the flat laminate wafer 100 can be formed via adhesive lamination, extrusion lamination, adhesive coating lamination, or any other known method. The flat laminate wafer 100 can include, for example, three layers with the center layer 120 being a thermoplastic elastomer. In step S403, the flat laminate wafer 100 is formed into the thermoformed laminate wafer 105. A thermoforming device may be used to modify the curvature and shape of the flat laminate wafer 100 prior to molding in the molding device. In step S405, the thermoformed laminate wafer 105 is arranged into the molding device. For example, the thermoformed laminate wafer 105 is placed adjacent to the concave mold insert 130 such that the convex side of the thermoformed laminate wafer 105 faces the concave mold insert 130. The concave mold insert 130 can secure the thermoformed laminate wafer 105 via a vacuum force. The mold sides 145a, 145b can be pushed together to couple and form a seal. In step S407, the polymer melt 140 can be injected into the cavity of the mold device between the thermoformed laminate wafer 105 and the convex mold insert 135. In step S409, the lens is molded via the cooling of the polymer melt 140 in the mold device. The heat and pressure from the polymer melt 140 can additionally heat the thermoformed laminate wafer 105 in order to further mold the thermoformed laminate wafer 105 against the curvature of the concave mold insert 130. It may be appreciated that this method can be utilized to form "flat" eyeglass lenses, plano eyeglasses lenses, prescription eyeglass lenses, and "high wrap" sunglasses and goggles.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

Embodiments of the present disclosure may also be as set forth in the following parentheticals.

(1) A method of forming an ophthalmic laminate lens, comprising forming a planar laminate by adhering a first polycarbonate layer to a first side of a thermoplastic elastomer layer, and adhering a second polycarbonate layer to a second side of the thermoplastic elastomer layer, the first polycarbonate layer having a thickness greater than 250 µm, the second polycarbonate layer having a thickness greater than 250 µm, and the thermoplastic elastomer layer having a thickness in a range of 15 µm to 150 µm; thermoforming the planar laminate into a curved laminate, the curve laminate having a pre-molding curvature; arranging the curved laminate in a mold; and molding, via the mold set at a predetermined temperature and a predetermined pressure, the curved laminate with a polymer melt into a curved lens.

(2) The method of (1), wherein the mold includes an concave mold insert and a convex mold insert, the curved laminate is arranged in the mold such that the second polycarbonate layer is adjacent to the concave mold insert, and the polymer melt is injected between the first polycarbonate layer of the curved laminate and the convex mold insert.

(3) The method of either (1) or (2), wherein a thickness of the first polycarbonate layer is equal to a thickness of the second polycarbonate layer, and the first polycarbonate layer in contact with the polymer melt produces a concave surface of the curved lens.

(4) The method of any one of (1) to (3), wherein the first thickness of the first polycarbonate layer and the second thickness of the second polycarbonate layer are each in a range of 380 µm to 800 µm.

(5) The method of either (1) or (2), wherein a thickness of the first polycarbonate layer is greater than a thickness of the second polycarbonate layer, and the first polycarbonate layer in contact with the polymer melt produces a concave surface of the curved lens.

(6) The method of any one of (1), (2), (4), or (5) wherein the thickness of the first polycarbonate layer is in a range of 380 µm to 800 µm, and.

(7) The method of any one of (1) to (6), wherein a diameter of the first polycarbonate layer and a diameter of the thermoplastic elastomer layer are both smaller than a diameter of the second polycarbonate layer.

(8) The method of any one of (1) to (7), wherein a thickness of the second polycarbonate layer is greater than a thickness of the first polycarbonate layer, and the first polycarbonate layer in contact with the polymer melt produces a concave surface of the curved lens.

(9) The method of any one of (1) to (8), wherein the thermoforming the planar laminate into the curved laminate is performed without any intermediate molding steps.

(10) The method of any one of (1) to (9), wherein the thermoformed curved laminate has a base curve greater than 5.0 D.

(11) The method of any one of (1) to (10), wherein a material of the thermoplastic elastomer layer is thermoplastic polyurethane.

(12) The method of any one of (1) to (11), wherein a material of the thermoplastic elastomer layer is polyether-block-polyamides.

(13) The method of any one of (1) to (12), wherein a thickness of the first polycarbonate layer is determined based on a temperature of the injected polymer melt such that the thickness of the first polycarbonate layer prevents heat transfer from the polymer melt to the thermoplastic elastomer layer above a predetermined threshold.

(14) An ophthalmic lens laminate, comprising a first polycarbonate layer having a thickness greater than 250 µm; a second polycarbonate layer having a thickness greater than 250 µm; and a thermoplastic elastomer layer having a thickness in a range of 15 µm to 150 µm, the thermoplastic elastomer layer being disposed between the first and second polycarbonate layers, the thermoplastic elastomer layer being bonded to the first polycarbonate layer on a first side of the thermoplastic elastomer and bonded to the second polycarbonate layer on a second side of the thermoplastic elastomer.

(15) The ophthalmic lens laminate of (14), wherein a thickness of the first polycarbonate layer is equal to a thickness of the second polycarbonate layer.

(16) The ophthalmic lens laminate of either (14) or (15), wherein the thickness of the first polycarbonate layer and the thickness of the second polycarbonate layer are each in a range of greater than 250 µm to 800 µm.

(17) The ophthalmic lens laminate of any one of (14) to (16), wherein the thickness of the first polycarbonate layer and the thickness of the second polycarbonate layer are each in a range of 360 µm to 600 µm.

(18) The ophthalmic lens laminate of (14), wherein a thickness of the first polycarbonate layer is greater than a thickness of the second polycarbonate layer.

(19) The ophthalmic lens laminate of either (14) or (18), wherein the thickness of the first polycarbonate layer and the thickness of the second polycarbonate layer are each in a range of 250 µm to 800 µm.

(20) The ophthalmic lens laminate of any one of (14), (18), or (19), wherein the thickness of the first polycarbonate layer is in a range of 360 µm to 800 µm, preferably 360 µm to 600 µm, and the thickness of the second polycarbonate layer is in a range of 250 µm to 550 µm, for example in a range of 450 µm to 550 µm or more preferably in a range of 250 µm to 350 µm.

(21) The ophthalmic lens laminate of (20), wherein the thickness of the first polycarbonate layer is in a range of 360 µm to 600 µm, and the thickness of the second polycarbonate layer is in a range of 250 µm to 350 µm.

What is claimed is:

1. A method of forming an ophthalmic laminate lens, comprising:
   forming a planar laminate by adhering a first polycarbonate layer to a first side of a thermoplastic elastomer layer, and adhering a second polycarbonate layer to a second side of the thermoplastic elastomer layer, the first polycarbonate layer having a thickness greater than 250 µm, the second polycarbonate layer having a thickness greater than 250 µm, and the thermoplastic elastomer layer having a thickness in a range of 15 µm to 150 µm;
   thermoforming the planar laminate into a curved laminate, the curved laminate having a pre-molding curvature;
   arranging the curved laminate in a mold; and
   molding, via the mold set at a predetermined temperature and a predetermined pressure, the curved laminate with a polymer melt into a curved lens.

2. The method of claim 1, wherein:
   the mold includes a concave mold insert and a convex mold insert;
   the curved laminate is arranged in the mold such that the second polycarbonate layer is adjacent to the concave mold insert; and
   the polymer melt is injected between the first polycarbonate layer of the curved laminate and the convex mold insert.

3. The method of claim 2, wherein:
   a thickness of the first polycarbonate layer is equal to a thickness of the second polycarbonate layer; and
   the first polycarbonate layer in contact with the polymer melt produces a concave surface of the curved lens.

4. The method of claim 3, wherein the first thickness of the first polycarbonate layer and the second thickness of the second polycarbonate layer are each in a range of 380 µm to 800 µm.

5. The method of claim 2, wherein:
   a thickness of the first polycarbonate layer is greater than a thickness of the second polycarbonate layer; and
   the first polycarbonate layer in contact with the polymer melt produces a concave surface of the curved lens.

6. The method of claim 5, wherein:
   the thickness of the first polycarbonate layer is in a range of 380 µm to 800 µm; and
   the second thickness of the second polycarbonate layer is in a range of 250 µm to 600 µm.

7. The method of claim 2, wherein a diameter of the first polycarbonate layer and a diameter of the thermoplastic elastomer layer are both smaller than a diameter of the second polycarbonate layer.

8. The method of claim 7, wherein:
a thickness of the second polycarbonate layer is greater than a thickness of the first polycarbonate layer; and
the first polycarbonate layer in contact with the polymer melt produces a concave surface of the curved lens.

9. The method of claim 2, wherein the thermoforming the planar laminate into the curved laminate is performed without any intermediate molding steps.

10. The method of claim 9, wherein the thermoformed curved laminate has a base curve greater than 5.0 D.

11. The method of claim 2, wherein a material of the thermoplastic elastomer layer is thermoplastic polyurethane.

12. The method of claim 2, wherein a material of the thermoplastic elastomer layer is polyether-block-polyamides.

13. The method of claim 12, wherein a thickness of the first polycarbonate layer is determined based on a temperature of the injected polymer melt such that the thickness of the first polycarbonate layer prevents heat transfer from the polymer melt to the thermoplastic elastomer layer above a predetermined threshold.

* * * * *